United States Patent [19]

Zychal

[11] Patent Number: 4,631,145

[45] Date of Patent: Dec. 23, 1986

[54] DEFOAMER AND ANTIFOAMER COMPOSITION AND METHOD FOR DEFOAMING AQUEOUS FLUID SYSTEMS

[75] Inventor: Craig Zychal, Houston, Tex.

[73] Assignee: Amoco Corporation, Chicago, Ill.

[21] Appl. No.: 612,871

[22] Filed: May 22, 1984

Related U.S. Application Data

[63] Continuation-in-part of Ser. No. 467,335, Feb. 17, 1983, abandoned.

[51] Int. Cl.$^4$ ............................................. B01D 19/04
[52] U.S. Cl. .................................... 252/321; 252/358
[58] Field of Search ................................ 252/321, 358

[56] References Cited

U.S. PATENT DOCUMENTS

| | | | |
|---|---|---|---|
| 2,799,650 | 7/1957 | McDermott et al. | 252/358 |
| 2,854,417 | 9/1958 | Edwards et al. | 252/358 |
| 4,122,032 | 10/1976 | Höllerich | 252/358 |

OTHER PUBLICATIONS

Ross, "Chemical Antifoaming Agents", *Chemical Industries*, May 1949, pp. 757–759.

*Primary Examiner*—Stephen J. Lechert, Jr.
*Assistant Examiner*—Anne Brookes
*Attorney, Agent, or Firm*—Timothy H. Briggs

[57] ABSTRACT

There is provided a composition which comprises (1) a predominantly $C_6$–$C_{12}$ high-boiling mixture of ketones, ethers, alcohols, esters, and aldehydes and (2) a fatty acid ester, such as sorbitan monooleate. Optionally, it can contain also a polyglycol having an average molecular weight of 3,800 or higher.

There is provided also a method for defoaming an aqueous fluid system and preventing the formation of foam in said system, which method comprises adding to said system an effective defoaming and antifoaming amount of the aforesaid composition.

24 Claims, No Drawings

DEFOAMER AND ANTIFOAMER COMPOSITION AND METHOD FOR DEFOAMING AQUEOUS FLUID SYSTEMS

CROSS-REFERENCE TO RELATED APPLICATIONS

This application is a continuation-in-part application of Ser. No. 467,335, filed in the U.S. Patent and Trademark Office on Feb. 17, 1983 now abandoned.

BACKGROUND OF THE INVENTION

Various fluid systems are employed in the drilling and maintenance of oil and gas wells. Such fluid systems include freshwater systems, saltwater systems, freshwater-polymer systems, and saltwater-polymer systems. Undesirable foaming can occur in any of these systems.

Excessive foaming is a major problem when using polymers in fresh water and, particularly, in brine systems. Polymers and salts tend to promote bubble formation, even during a very modest circulation of fluid. Foam is formed as a result of a gas trying to break through the "skin" of surface tension of a liquid. When the surface tension is high, such high surface tension being caused by a strong inelastic "skin", the rising gas exerts sufficient strain to rupture this barrier. On the other hand, when the surface tension is low, such low surface tension being caused by polymers, salts, or treatment chemicals that are present in the environment, the rising gases will stretch the elastic "skin" into bubbles, consequently generating foam.

Various surface active agents or spreading agents have been employed to minimize or to prevent the formation of foam in a variety of fluid systems. For example, Finigan, et al., in U.S. Pat. No. 2,884,474, teach the use inter alia of non-ionic antifoam agents, such as sorbitan oleate and sorbitan trioleate, for desorption of butadiene-1,3 from an ammoniacal copper ion solvent. In U.S. Pat. No. 3,076,768, Boylan discloses the use of sorbitan trioleate, sorbitan monostearate, and polyoxyethylene sorbitan tristearate as defoamers in an inexpensive defoaming composition comprising a water-insoluble, organic liquid, such as kerosene and mineral oils, and a finely-divided hydrophobic silica suspended in the organic liquid. In U.S. Pat. No. 3,705,859, Boylan teaches that sorbitan monooleate can be added to an aqueous system to abate the formation of foam. In U.S. Pat. No. 4,105,802, Cho, et al., disclose the use of sorbitan monooleate as an antifoaming agent when producing a carbonated coffee drink. In U.S. Pat. Nos. 4,116,706 and 4,209,336, Previte discloses the use of synthetic non-ionic polyol surfactants, such as those sold commercially under the trade name "Pluronic", and non-ionic fatty acid partial esters of sorbitol anhydride, such as sorbitan monooleate, as surface active agents that are suitable for use in hydraulic cement compositions to enhance the compressive strength thereof. In U.S. Pat. No. 3,248,289, Shinozaki, et al., disclose a composition for the prevention and treatment of frothy bloat in ruminants, which composition can comprise as main active ingredients block polymers of two kinds of the same or different polyalkylene glycols, ethers of said polyalkylene glycols with primary alcohols, esters of said polyalkylene glycols with fatty acids, or fatty acids esters of anhydrosorbitol, such as sorbitan monooleate, and as adjuvants alcohols, such as octyl alcohol, octanol-2,2-ethylhexylalcohol, cyclohexanol, lauryl alcohol, cetyl alcohol, and stearyl alcohol, and higher glycols, and oils, such as soybean oil and castor oil.

Now there has been formulated a novel, biodegradable defoamer and antifoamer composition for use in any fresh-water system, saltwater system, freshwater-polymer system, or saltwater-polymer system. The resulting formulation not only causes surface bubbles to break on initial addition of the composition, but such composition continues to provide a protective barrier (antifoam) against additional foam caused by subsequent agitation of the fluid system.

SUMMARY OF THE INVENTION

Broadly, according to the present invention, there is provided a defoamer and antifoamer composition comprising (1) a predominantly $C_6$–$C_{12}$ high-boiling mixture of ketones, ethers, alcohols, esters, and aldehydes and (2) a fatty acid ester. Optionally, the composition comprises further a polyglycol having an average molecular weight of 3,800 or higher. The predominantly $C_6$–$C_{12}$ component mixture is present in an amount within the range of about 50 wt % to about 90 wt %. The fatty acid ester, such as sorbitan monooleate or glycerol monooleate, is present in an amount within the range of about 10 wt % to about 50 wt %. The polyglycol can be employed in an amount up to about 10 wt %. Each of the above values is based upon the total weight of the composition.

In addition, there is provided a method for defoaming an aqueous fluid system and preventing the formation of foam in said system, which method comprises adding to said system an effective defoaming and antifoaming amount of a composition comprising (1) a predominantly $C_6$–$C_{12}$ high-boiling mixture of ketones, ethers, alcohols, esters, and aldehydes and (2) a fatty acid ester.

DESCRIPTION AND PREFERRED EMBODIMENTS

In the drilling of oil wells, various fluids, such as workover fluids, completion fluids, and drilling fluids, are employed. Often polymers are used as viscosifiers in such fluids, particularly workover fluids and completion fluids. However, such fluids also contain fresh water or salt water. As pointed out hereinabove, the presence of polymers and fresh water or salt water can result in the production of excessive amounts of foam. The amount of foam that can be produced depends upon the severity and amount of agitation present, the type of treating chemicals that are present, the salinity of the fluid, and the viscosity of the fluid. In order to minimize the amount of foam that is formed or to prevent the formation of new foam, defoamers and antifoamers have been added to such aqueous systems.

There has now been found a defoamer and antifoamer composition which can be employed suitably to prevent or to minimize the amount of foam produced in various aqueous systems, such as a freshwater system, a saltwater system, a freshwater-polymer system, or a saltwater-polymer system. Broadly, this composition comprises (1) a predominantly $C_6$–$C_{12}$ high-boiling mixture of ketones, ethers, alcohols, esters, and aldehydes and (2) a fatty acid ester. The term "alcohols" is used herein to represent alcohols, diols, or combinations thereof. The aforesaid predominantly $C_6$–$C_{12}$ high-boiling mixture is sometimes referred to hereinafter as "$C_6$–$C_{12}$ high-boiling mixture". The term "predominantly $C_6$–$C_{12}$ high-boiling mixture" represents a mixture containing at least 40 wt % components having 6 to 12 carbon atoms.

The composition of the present invention contains the $C_6$–$C_{12}$ high-boiling mixture in an amount within the range of about 50 wt % to about 90 wt %, based upon the total weight of the composition. Preferably, it contains the $C_6$–$C_{12}$ high-boiling mixture in an amount within the range of about 70 wt % to about 80 wt %. More preferably, the composition contains the $C_6$–$C_{12}$ high-boiling mixture in an amount of about 70 wt %. It is to be understood that the individual components of the aforesaid $C_6$–$C_{12}$ high-boiling mixture can vary by any amount; however, as shown hereinafter, some alcohols, specifically about 7 wt % to about 85 wt %, should be present in such mixture.

The fatty acid ester can be present in an amount within the range of about 10 wt % to about 50 wt %, based upon the weight of the composition. Preferably, it is present in an amount within the range of about 20 wt % to about 30 wt %. A preferred fatty acid ester is a sorbitan monooleate. Other suitable fatty acid esters are sorbitan monolaurate, sorbitan monostearate, sorbitan monopalmitate, and glycerides, such as glycerol monooleate. While a fatty acid ester is employed in the composition of the present invention, it is contemplated that an alkoxylated sorbitan fatty acid can be used as a substitute for the fatty acid ester.

In view of the above, a more specific embodiment of the composition of the present invention consists essentially of (1) a predominantly $C_6$–$C_{12}$ high-boiling mixture of ketones, ethers, alcohols, esters, and aldehydes and (2) a fatty acid ester, wherein said predominantly $C_6$–$C_{12}$ high-boiling mixture is present in an amount within the range of about 50 wt % to about 90 wt % and said fatty acid ester is present in an amount within the range of about 10 wt % to about 50 wt %.

It is also contemplated that the composition of the present invention can contain optionally a polyglycol having an average molecular weight of 3,800 or higher. When the composition does contain a polyglycol, such polyglycol will be present in an amount of up to about 10 wt %.

The composition of the present invention can be prepared suitably by adding at room temperature with agitation the fatty acid ester and the polyglycol, when used, to the $C_6$–$C_{12}$ high-boiling mixture. It is preferred to add either the fatty acid ester or the polyglycol to the $C_6$–$C_{12}$ high-boiling mixture, since the latter is employed generally as the major component and since it is less viscous than the two items being added to it.

Each of the components of the composition of the present invention can be obtained in commerce. For example, the $C_6$–$C_{12}$ high-boiling mixture can be obtained a distillation by-products from the McCarley Oil Corporation or from the Badische Corporation of BASF. Sorbitan fatty acid esters, such as sorbitan monooleate, can be obtained conveniently from Lonza, Inc., under the "Lonzest" trade name. A product that is primarily glycerol monooleate can be obtained from ICI Americas, Inc. The optional component of the composition of the present invention, a polyglycol having an average molecular weight of 3,800 or higher, can be obtained from BASF Wyandotte Corporation under the "Pluronic" trade name as a polyoxyethylene-polypropylene block polymer.

The composition of the present invention can be used as a defoamer and an antifoamer by adding it to the aqueous fluid system, such as a freshwater system, a saltwater system, a freshwater-polymer system, or a salt-water-polymer system, in an amount which is at least about 0.25 pound of composition per barrel (42 gallons) of fluid system being treated. No maximum value is being recited for such utilization, since the amount of composition being used is dependent upon a number of factors, among which are included the amount of solids in the fluid being treated, the type of apparatus which contains the fluid, the amount of surface which the fluid contacts, the type and severity of agitation, and the severity of the foaming problem.

In view of the above, there is provided a method for defoaming an aqueous fluid system and preventing the formation of foam in said system, which method comprises adding to said system an effective defoaming and antifoaming amount of a composition comprising (1) a predominantly $C_6$–$C_{12}$ high-boiling mixture of ketones, ethers, alcohols, esters, and aldehydes and (2) a fatty acid ester.

More particularly, the method of the present invention comprises adding to an aqueous fluid system an effective defoaming and antifoaming amount of a composition consisting essentially of (1) a predominantly $C_6$–$C_{12}$ high-boiling mixture of ketones, ethers, alcohols, esters, and aldehydes and (2) a fatty acid ester, said predominantly $C_6$–$C_{12}$ high-boiling mixture being present in an amount within the range of about 50 wt % to about 90 wt % and said fatty acid ester being present in an amount within the range of about 10 wt % to about 50 wt %.

The polyglycol component of the composition of the present invention is optional. However, it can be employed conveniently as a component, if the composition is being used to treat a fluid system which does not contain a zinc brine. The presence of zinc results in the cross-linking of the polyglycol component causing the formation of solid polymer agglomerates.

Since there is a tendency for sorbitan monooleate to cloud up the $C_6$–$C_{12}$ high-boiling mixture when the former is used in an amount of at least 25 wt % of the total weight of the composition, the composition containing such an amount of sorbitan monooleate should be agitated prior to its use as either a defoamer or an antifoamer.

An embodiment of the composition of the present invention is a composition which comprises about 50 wt % to about 90 wt % of a predominantly $C_6$–$C_{12}$ high-boiling mixture of ketones, ethers, alcohols, esters, and aldehydes and about 10 wt % to about 50 wt % of the fatty acid ester, such as sorbitan monooleate.

Another embodiment of the composition of the present invention is a composition which comprises about 50 wt % to about 90 wt % of a predominantly $C_6$–$C_{12}$ high-boiling mixture of ketones, ethers, alcohols, esters, and aldehydes, about 10 wt % to about 50 wt % of sorbitan monooleate, and up to about 10 wt % of a polyglycol having an average molecular weight of 3,800 or higher.

The following examples are presented for purposes of illustration only and are not intended to limit the scope of the present invention.

EXAMPLE 1

An embodiment of the composition of the present invention was prepared by adding sorbitan monooleate in the form of "Lonzest SMO", obtained from Lonza, Inc., and "Pluronic L101", a polyoxyethylene-polypropylene block polymer, obtained from BASF Wyandotte Corporation, to an alcohol distillation by-product, a predominantly $C_6$-$C_{12}$ high-boiling mixture of ketones, ethers, alcohols, esters, and aldehydes, obtained from McCarley Oil Corporation and identified as "Product OH-21". The components were employed in a amount to provide a mixture that contained 70 wt % of the predominantly $C_6$-$C_{12}$ high-boiling mixture of ketones, ethers, alcohols, esters, and aldehydes, 20 wt % sorbitan monooleate, and 10 wt % polyglycol having an average molecular weight of 3,800. This composition is identified hereinafter as Defoamer A.

A typical analysis of "Product OH-21" is: 2 wt % $C_7$ alcohol, 78 wt % $C_8$-$C_{12}$ alcohol, 2 wt % $C_{12}$+alcohol, 7 wt % $C_{12}$+aldehydes, 7 wt % $C_{12}$+ethers, and 4 wt % $C_{12}$+esters.

A commercial defoamer identified as W. O. Defoam was obtained from Milchem Incorporated, a subsidiary of Baker International Corporation, and is identified hereinafter as Defoamer B.

Each of these defoamers was employed at ambient temperature to defoam a fluid system made up of one gram of "Kla-Free" polymer obtained from the Amoco Chemicals Corporation in 350 milliliters of saturated sodium chloride water. In each case, the sample of one gram of "Kla-Free" polymer in 350 milliliters of saturated sodium chloride water was stirred for 10 minutes in a Hamilton Beach "Multi-Mixer" at high shear. During the last ten seconds of mixing, a sample of 0.25 ml of the particular defoamer to be tested was added. In each case, the sample containing the defoamer was then poured into a 500-ml graduated cylinder where the amount of foam was recorded every 30 seconds. The results of this test are shown hereinbelow in Table I.

TABLE I

| Minutes | Milliliters of Foam | |
|---|---|---|
| | Defoamer A | Defoamer B |
| ½ | 5 | 115 |
| 1 | 0 | 105 |
| 1½ | 0 | 95 |
| 2 | 0 | 90 |
| 2½ | 0 | 80 |
| 3 | 0 | 75 |
| 3½ | 0 | 70 |
| 4 | 0 | 70 |
| 4½ | 0 | 65 |
| 5 | 0 | 60 |
| 5½ | 0 | 60 |
| 6 | 0 | 55 |

The results of this comparative test dramatically demonstrate the effectiveness of the embodiment of the composition of the present invention, i.e., Defoamer A, relative to that of the commercially obtained defoamer, i.e., Defoamer B. Defoamer A was superior to Defoamer B in this test.

EXAMPLE 2

Four embodiments of the composition of the present invention were prepared. Each of these embodiments contained a predominantly $C_6$-$C_{12}$ high-boiling mixture of ketones, ethers, alcohols, esters, and aldehydes, and sorbitan monooleate. Defoamer C contained 10 wt % sorbitan monooleate and 90 wt % predominantly $C_6$-$C_{12}$ high-boiling mixture of ketones, ethers, alcohols, esters, and aldehydes. Defoamer D contained 20 wt % sorbitan monooleate and 80 wt % predominantly $C_6$-$C_{12}$ high-boiling mixture of ketones, ethers, alcohols, esters, and aldehydes. Defoamer E contained 30 wt % sorbitan monooleate and 70 wt % predominantly $C_6$-$C_{12}$ mixture of ketones, ethers, alcohols, esters, and aldehydes. Defoamer F contained 50 wt % sorbitan monooleate and 50 wt % predominantly $C_6$-$C_{12}$ high-boiling mixture of ketones, ethers, alcohols, esters, and aldehydes. For each of these compositions, the $C_6$-$C_{12}$ high-boiling mixture was "Product OH-21" obtained from McCarley Oil Corporation. The sorbitan monooleate was obtained from Lonza, Inc., and identified as "Lonzest SMO".

Each of the Defoamers C, D, E, and F was tested at ambient temperature for its ability to defoam a fluid system containing 1.0 gram of "Kla-Free" polymer obtained from the Amoco Chemicals Corporation and 350 ml of saturated sodium chloride water. The testing was conducted according to the method described hereinabove in Example 1. The results of these tests are shown hereinbelow in Table II.

TABLE II

| Minutes | Milliliters of Foam | | | |
|---|---|---|---|---|
| | Defoamer C | Defoamer D | Defoamer E | Defoamer F |
| ½ | 160 | 175 | 5 | 10 |
| 1 | 130 | 75 | 0 | 5 |
| 1½ | 95 | 15 | 0 | 0 |
| 2 | 60 | 0 | 0 | 0 |
| 2½ | 35 | 0 | 0 | 0 |
| 3 | 20 | 0 | 0 | 0 |
| 3½ | 10 | 0 | 0 | 0 |
| 4 | 5 | 0 | 0 | 0 |
| 4½ | 0 | 0 | 0 | 0 |

The results of the tests performed in this example clearly demonstrate the range of compositions that can be employed as compositions of the present invention. In each case, the foam was eliminated in less than 4½ minutes. The most effective composition was that of Defoamer E, which contained 30 wt % sorbitan monooleate and 70 wt % $C_6$-$C_{12}$ high-boiling mixture of ketones, ethers, alcohols, esters, and aldehydes.

EXAMPLE 3

Two additional embodiments of the composition of the present invention were prepared. The first of these, identified hereinafter as Defoamer G, was prepared by adding "Arlacel 121", obtained from ICI Americas, Inc., and "Pluronic L101" to the alcohol-containing "Product OH-21". The second of these, identified hereinafter as Defoamer H, was prepared by adding "Arlacel 121" and "Pluronic L101" to an alcohol-containing product obtained from Badische Corporation and identified as "EP-202". The Arlacel 121 was made up of primarily glycerol monooleate diluted with propylene glycol, containing no more than 0.02% BHA and no more than 0.01% citric acid, added as preservatives, Polysorbate 20, and water. The components of each embodiment were employed in an amount to provide a mixture that contained 70 wt % of the particular alcohol-containing mixture, 20 wt % "Arlacel 121", and 10 wt % "Pluronic L101".

A typical analysis of the Badishce EP-202 is as follows 10.3 wt % aldehydes (4.3 wt % 2-ethyl hexanal, 5.8 wt % 2-ethyl hexenal, 0.1 wt % i-butyraldehyde, and 0.1 wt % n-butyraldehyde), 7.9 wt % alcohols (4.2 wt % n-butanol, 0.7 wt % i-butanol, and 3.0 wt % 2-ethylhexanol); 10.0 wt % acetals (mainly dibutoxybutanes); 35.5 wt % alcohol esters and ethers ($C_8$-esters and ethers, $C_{12}$-esters and ethers, and $C_{16}$-esters and ethers); 8.0 wt % acids (3.5 wt % n-butyric acid, 4.5 wt % i-butyric acid, and traces of 2-ethyl hexanoic acid), and 28.3 wt % higher condensation products of butyraldehyde.

Defoamer G and Defoamer H were employed individually at ambient temperature to defoam a fluid system made up of 1 gm of "Kla-Free" polymer obtained from the Amoco Chemicals Corporation in 350 milliliters of saturated sodium chloride water. These tests were conducted in a manner similar to the tests described in Example 1. In either case, after one-half minute, only 5 milliliters of foam remained. Consequently, these embodiments of the defoamer of the present invention performed similarly to that of Defoamer A in Example 1, a different embodiment of the composition of the present invention.

The predominantly $C_6$–$C_{12}$ high-boiling mixture of ketones, ethers, alcohols, esters, and aldehydes employed in Defoamer A contained approximately 82 wt % alcohols, while the predominantly $C_6$–$C_{12}$ high-boiling mixture employed in Defoamer G and Defoamer H contained 7.9 wt % alcohols. Accordingly, a $C_6$–$C_{12}$ high-boiling mixture of ketones, ethers, alcohols, esters, and aldehydes that is suitable for use as a component of the composition of the present invention will contain alcohols in an amount of about 7 wt % to about 85 wt %, preferably, about 7.9 wt % to about 82 wt %, based upon the weight of said $C_6$–$C_{12}$ high-boiling mixture.

It is contemplated that the defoaming and antifoaming properties of the composition of the present invention can be used suitably at rig sites in drilling fluids, workover fluids, and completion fluids having an aqueous base.

What is claimed is:

1. A defoamer and antifoamer composition for use in aqueous fluid systems used in the drilling and maintenance of oil and gas wells consisting essentially of (1) a high-boiling mixture comprising ethers, alcohols, esters and aldehydes containing at least 40 wt % components having from 6 to 12 carbon atoms and (2) a fatty acid ester, wherein said high-boiling mixture is present in an amount within the range of about 50 wt % to about 90 wt % and said fatty acid ester is present in an amount within the range of about 10 wt % to about 50 wt %.

2. The composition of claim 1, which composition also contains a polyglycol having an average molecular weight of 3,800 or higher, said polyglycol being present in an amount of up to about 10 wt %.

3. The composition of claim 2, wherein said fatty acid ester is a sorbitan fatty acid ester or a glyceride.

4. The composition of claim 3, wherein said fatty acid ester is sorbitan monooleate or glycerol monooleate.

5. The composition of claim 4, wherein said high-boiling mixture is present in an amount within the range of about 70 wt % to about 80 wt % and said fatty acid ester is present in an amount within the range of about 20 wt % to about 30 wt %.

6. The composition of claim 5, wherein said alcohols are present in said high-boiling mixture in an amount within the range of about 7.9 wt % to about 82 wt %, based upon the weight of said high-boiling mixture.

7. The composition of claim 1, wherein said fatty acid ester is a sorbitan fatty acid ester or a glyceride.

8. The composition of claim 7, wherein said sorbitan fatty acid ester is sorbitan monooleate or glycerol monooleate.

9. The composition of claim 8, wherein the high-boiling mixture is present in an amount within the range of about 70 wt % to about 80 wt % and said fatty acid ester is present in an amount within the range of about 20 wt % to about 30 wt %.

10. The composition of claim 9, wherein said alcohols are present in said high-boiling mixture in an amount within the range of about 7.9 wt % to about 82 wt %, based upon the weight of said high-boiling mixture.

11. The composition of claim 7, wherein said high-boiling mixture is present in an amount within the range of about 70 wt % to about 80 wt % and said fatty acid ester is present in an amount within the range of about 20 wt % to about 30 wt %.

12. The composition of claim 1, wherein said alcohols are present in said high-boiling mixture in an amount within the range of about 7 wt % to about 85 wt %, based upon the weight of said high-boiling mixture.

13. The composition of claim 1, wherein said high-boiling mixture comprises in addition to ethers, alcohols, esters and aldehydes at least one ketone.

14. A method for defoaming an aqueous fluid system used in the drilling and maintenance of oil and gas wells and preventing the formation of foam in said system, which method comprises adding to said system an effective defoaming and antifoaming amount of a composition consisting essentially of (1) a high-boiling mixture comprising ethers, alcohols, esters and aldehydes and (2) a fatty acid ester, said high-boiling mixture being present in an amount within the range of about 50 wt % to about 90 wt % and said fatty acid ester being present in an amount within the range of about 10 wt % to about 50 wt %.

15. The method of claim 14, wherein said composition is added to said aqueous fluid system in an amount of at least about 0.25 pound of composition per barrel (42 gallons) of fluid system being treated.

16. The method of claim 15, wherein said fatty acid ester of said composition is a sorbitan fatty acid ester or a glyceride.

17. The method of claim 16, wherein said fatty acid ester of said composition is sorbitan monooleate or glycerol monooleate.

18. The method of claim 17, wherein said aqueous fluid system is a freshwater system, a saltwater system, a freshwater-polymer system, or a saltwater-polymer system.

19. The method of claim 18, wherein said alcohols of said composition are present in said high-boiling mixture in an amount within the range of about 7 wt % to about 85 wt %, based upon the weight of said high-boiling mixture.

20. The method of claim 19, wherein said composition also contains a polyglycol having an average molecular weight of 3,800 or higher, said polyglycol being present in an amount of up to about 10 wt %.

21. The method of claim 14, wherein said fatty acid ester of said composition is a sorbitan fatty acid ester or a glyceride.

22. The method of claim 21, wherein said composition also contains a polyglycol having an average molecular weight of 3,800 or higher, said polyglycol being present in an amount of up to about 10 wt %.

23. The method of claim 22, wherein said aqueous fluid system is a freshwater system, a saltwater system, a freshwater-polymer system, or a saltwater-polymer system.

24. The method of claim 14, wherein said high-boiling mixture comprises in addition to ethers, alcohols, esters and aldehydes at least one ketone.

* * * * *